US005793997A

United States Patent [19]
Briggs

[11] Patent Number: 5,793,997
[45] Date of Patent: Aug. 11, 1998

[54] INTERFACE ARCHITECTURE FOR CONNECTION TO A PERIPHERAL COMPONENT INTERCONNECT BUS

[75] Inventor: Randall Don Briggs, Boise, Id.

[73] Assignee: Hewlett-Packard Company, Palo Alto, Calif.

[21] Appl. No.: 584,413

[22] Filed: Jan. 11, 1996

[51] Int. Cl.$^6$ .................................................. G06F 12/00
[52] U.S. Cl. ............................................ 395/309; 395/308
[58] Field of Search ................................. 395/306, 307, 395/308, 309, 310

[56] References Cited

U.S. PATENT DOCUMENTS 4,641,261  2/1987  Dwyer et al. ........................ 364/900

FOREIGN PATENT DOCUMENTS

| 0 382 342 A2 | 1/1990 | European Pat. Off. | G06F 13/42 |
| 0 627 688 A1 | 5/1994 | European Pat. Off. | G06F 13/28 |
| 0 629 955 A1 | 5/1994 | European Pat. Off. | G06F 13/36 |
| 2 286 910 | 12/1994 | United Kingdom | G06F 13/38 |
| WO 96/17303 | 6/1996 | WIPO | G06F 13/40 |

OTHER PUBLICATIONS

AMCC–'PCI Controller for Add–On Applications'–1995–(pp. 1-2).
DesignWare™–'Description of DesignWare™ Components for Release 3.1b–Beta Program'–Jun. 1994.
LSI Logic–Jul. 14, 1994–'PCI–32 FlexCore™ Architecture Technical Manual'–(pp. 1-1—2-2).
PCI System Architecture Series, vol. 4–Shanley et al.–(pp. 30–49).

*Primary Examiner*—Ayaz R. Sheikh
*Assistant Examiner*—David A. Wiley

[57] ABSTRACT

A data processing system includes a first bus which couples a processor and other components and is configured to operate in accord with a standard protocol. Plural functional modules, each performing a function required by the data processing system are coupled to a second bus. The second bus includes dedicated read/write enable lines for each functional module and plural data lines coupled in common to all functional modules. A bridge module includes a controller which is coupled between the first and second busses. The controller is responsive to a read or write command received from the processor, to apply a logic signal to the read/write enable circuits coupled to a functional module designated by the received command. The functional module responds by either providing the requested data onto the data lines of the second bus or receiving data from the second bus into the functional module, as the case may be. The dedicated read/write enable lines for each functional module allow plural functional modules to be attached to the second bus and to be controlled, without requiring special configuration of command inputs from the first bus. Direct memory accesses are also enabled, both to and from the functional modules.

5 Claims, 7 Drawing Sheets

SINGLE WORD READ

५,७९३,९९७

INTERFACE ARCHITECTURE FOR CONNECTION TO A PERIPHERAL COMPONENT INTERCONNECT BUS

FIELD OF THE INVENTION

This invention relates to a circuit architecture for interconnecting modules internal to a data processing system to a Peripheral Component Interface (PCI) bus and, more particularly, to a circuit architecture which enables a single interface structure to connect a PCI bus to a plurality of multi-function device spaces.

BACKGROUND OF THE INVENTION

The PCI interface is fast becoming a preferred interface for input/output functions in computer-related apparatus. The PCI specification is an industry standard which provides details regarding signal levels, protocols and circuit configurations for interconnecting external devices to existing internal bus structures in data processing equipment. The PCI specification provides for the creation of configuration spaces, each containing at least one functional module, and enables an input address on the PCI bus to be mapped to a functional module within a configuration space. In general, each configuration space is limited to one functional module.

Because the PCI interface requires considerable logic for its implementation, it is desirable to provide a single interface which enables communication between a PCI bus and multiple functional modules. While the PCI specification mentions a multifunctional ability, few details are offered concerning implementation of such an interface facility. Nevertheless, there is a demand for a low cost PCI interface which enables not only multiple configuration spaces (as is enabled by the PCI specification), but also enables multiple functions to be interfaced to the PCI functionality.

The prior art includes a number of approaches to providing interface functions between internal modular functions of a data processing system and a PCI bus. One solution has been to require each input/output function to have its own PCI interface and to simply place each input/output function, together with its individual interface, together on a single, integrated circuit.

LSI Logic, Inc. offers a "PCI-32 FlexCore" architecture for interfacing internal computer functions to a PCI bus. The FlexCore product interfaces internally to an Intel Corp. 486 "VL" bus. The FlexCore product ranges in size from 10,000 to 43,000 gates and is, as a result, a complex and relatively expensive solution to the interface problem. While the FlexCore product does appear to support access to multiple functional modules within a configuration space, details as to how this is accomplished are not known.

The Synopsys Corporation offers a "DesignWare PCI Macro Set". The Synopsys product comprises a number of blocks of code that are sold to a customer who incorporates the functional designs represented by the code into the customer's design. As a result, the interface to the customer's circuitry is not well defined and multiple modular functions within a configuration are not supported by the resulting interface. If multiple input/output functions are accessed, they must share a single configuration space.

The AMCC Corporation offers a "PCI controller for add-on applications" which provides a method for interfacing an embedded microprocessor subsystem to a PCI bus. This product is not targeted at a non-microprocessor bus which is utilized to access multiple functions that are not internal to the microprocessor.

SUMMARY OF THE INVENTION

A data processing system includes a first bus which couples a processor and other components and is configured to operate in accord with a standard protocol. Plural functional modules, each performing a function required by the data processing system are coupled to a second bus. The second bus includes dedicated read/write enable lines for each functional module and plural data lines coupled in common to all functional modules. A bridge module includes a controller which is coupled between the first and second busses. The controller is responsive to a read or write command received from the processor, to apply a logic signal to the read/write enable circuits coupled to a functional module designated by the received command. The functional module responds by either providing the requested data onto the data lines of the second bus or receiving data from the second bus into the functional module, as the case may be. The dedicated read/write enable lines for each functional module allow plural functional modules to be attached to the second bus and to be controlled, without requiring special configuration of command inputs from the first bus. Direct memory accesses are also enabled, both to and from the functional modules.

DETAILED DESCRIPTION OF THE INVENTION

Figure 1:
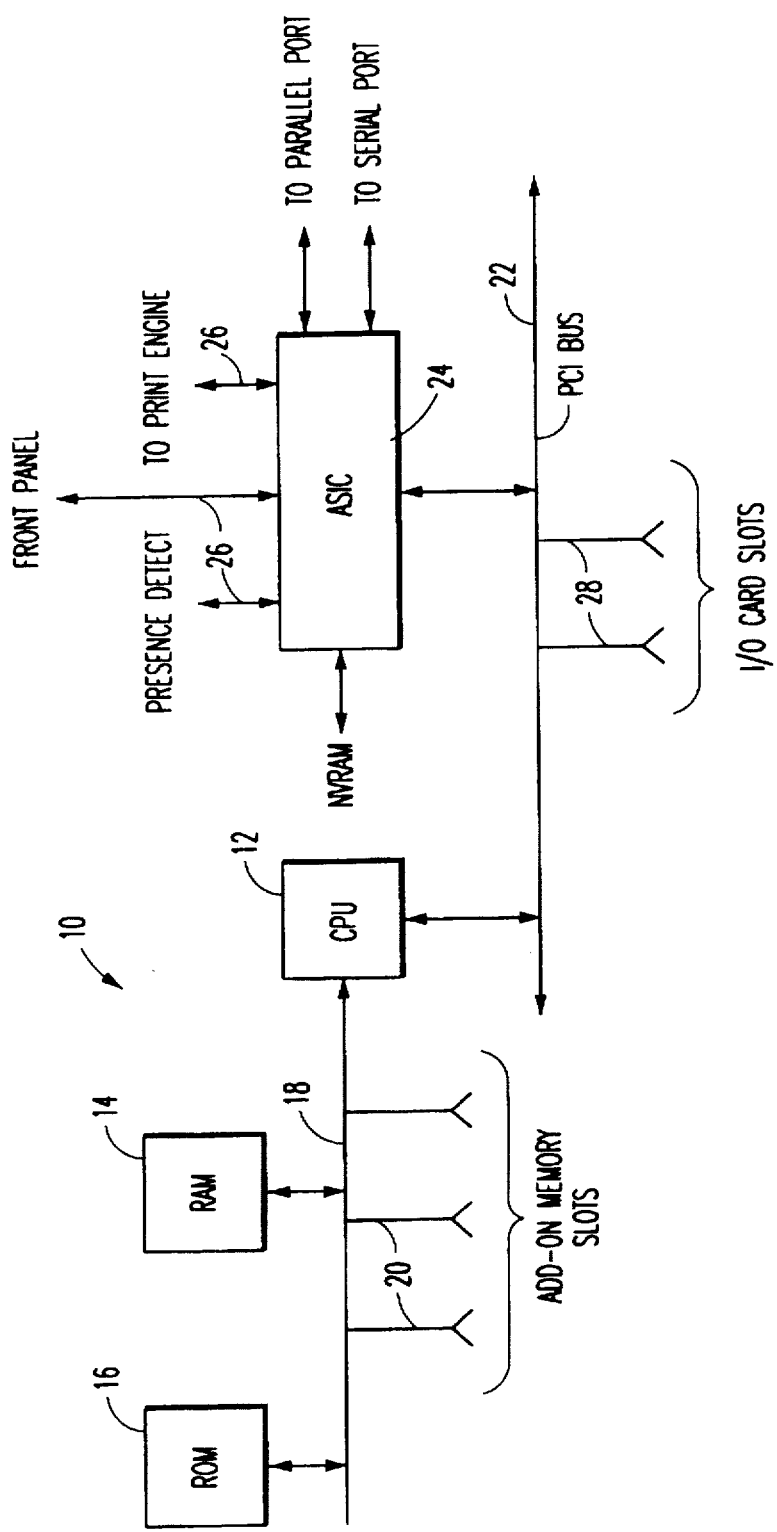
FIG. 1 is a block diagram of a representative data processing system incorporating the invention hereof.

Referring to FIG. 1, a data processing system 10 will be described in the context of a printer which may either be a laser printer or an ink jet printer. However, it is to be understood that the invention is equally applicable to any data processing system that employs an input/output bus which conforms to a widely accepted standard protocol such as PCI.

Data processing system 10 incorporates a central processing unit (CPU) 12 to which is coupled a random access memory (RAM) 14 and a read only memory (ROM) 16. RAM 14 and ROM 16 are both connected to CPU 12 by a processor bus 18. Bus 18 also couples to CPU 12 a plurality of add-on memory slots 20.

An input/output bus 22 is configured to couple CPU 12 to an ASIC 24. ASIC 24 incorporates plural functional modules which perform required actions in printer 10 to enable the operation thereof. The functional modules within operate in both a master and a slave configuration. In the slave configuration, the functional modules are controlled by command inputs from CPU 12 to perform their defined functions. In response to those commands, the functional modules issue signals on separate output lines 26 to the respectively connected hardware components of the printer system 10.

In the master relationship, the functional modules perform direct memory access (DMA) actions which bypass intermediate storage of data in CPU 12 and cause data to be directly written into RAM 14 or directly read from RAM 14, as the case may be.

A PCI bus 22 interconnects CPU 12 and ASIC 24 with plural input/output card slots 28 wherein devices can be incorporated into printer 10. PCI bus 22 is preferably configured to operate in accord with a commonly accepted standard protocol, such as the Peripheral Component Interconnect protocol. As indicated above, the PCI interface architecture is widely accepted in the data processing industry for input/output communications between a data processing system and add/on devices.

Incorporated into ASIC 24 is an ASIC bus structure which connects each of a plurality functional modules incorporated therein. That ASIC bus structure is coupled to PCI bus 22 via an interface which incorporates the invention (and will be described in detail below). However, before considering the details of the structure of ASIC 24, a brief introduction to the PCI architecture will be provided.

There are two participants in every PCI data transfer; an initiator and a target. The initiator, or bus master, is the device that initiates a transfer. The target, or slave is the device currently addressed by the initiator for the purpose of performing a data transfer. Every PCI transaction commences with an address phase wherein the initiator identifies the target device and the type of transaction. The target device is identified by driving an address within the target device's assigned range onto the PCI address lines on PCI bus 22. At the same time, the initiator identifies the type of transaction by driving a command type onto PCI bus 22.

The interface function within interface ASIC 24 decodes the address on the address bus, determines the command type and takes further actions which enables the requested target module to respond in the required manner. After the address phase, the data phase commences wherein the initiator drives the required data onto PCI bus 22. The amount of data transferred during a data phase is determined by a number of signals that are asserted by the initiator during the data phase.

Figure 2:
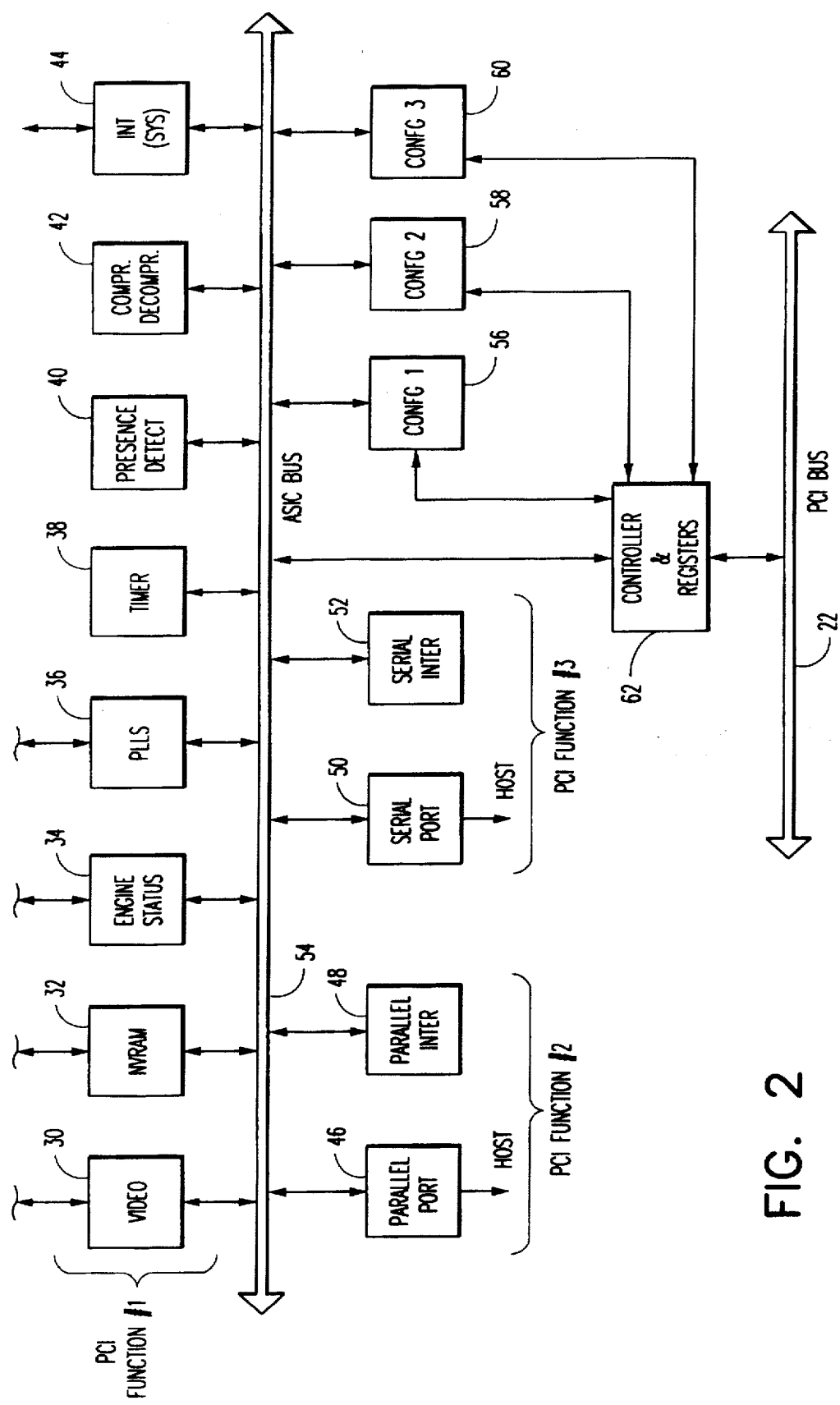
FIG. 2 is a block diagram illustrating a bridge structure for interfacing a PCI bus to multiple functional modules incorporated into an application specific integrated circuit (ASIC).

Turning to FIG. 2, details of ASIC 24 will be further described. The PCI architecture enables the establishment of plural configuration spaces of functional modules which are independently addressable by addresses appearing on PCI bus 22. Within ASIC 24 are a plurality of functional modules which are required for operation of printer 10. A video module 30 provides a video raster stream to a print engine (not shown). An NVRAM functional module 32 provides access to a serial non-volatile RAM (NVRAM). Engine status module 34 provides status information regarding the state of the print engine. PLL module 36 includes one or more phase locked loops which enable the output of clocking signals to functionalities within printer 10. Timer module 38 provides timing functions. Presence detect module 40 is utilized to determine the configuration of printer 10 upon power up. More specifically, presence detect module 40 determines what devices are interconnected on CPU bus 18. Compression/decompression functional module 42 is employed to compress and decompress print data, as required. Interrupt functional module 44 handles system interrupt actions appearing on ASIC Bus 54. Parallel interface module 46 is employed to interconnect printer 10 to a host processor and interrupt/parallel module 48 is used to handle interrupts through parallel interface port functional module 46. Similarly, serial port module 50 provides a serial port to a host processor and interrupt/serial module 52 handles interrupts for the serial port.

All of the above described functional modules are interconnected via an ASIC bus 54 which includes both data, address and control lines. Also connected to ASIC bus 54 are a plurality of configuration space modules 56, 58 and 60. Each configuration space module identifies the addresses of one or more functional modules contained within the defined configuration space. Thus, the addresses of functional modules within PCI function 1 are listed within configuration space module 56; the addresses of the functional modules assigned to PCI function No. 2 are listed in configuration space module 58 and the addresses of functional modules 50 and 52 within PCI functional area No. 3 are listed in configuration space module 60.

If an address is received over PCI bus 22 for a functional module assigned to one of the configuration spaces, the respective configuration space module provides a "hit" output to a controller 62, which is also coupled to ASIC bus 54. In response to a "hit" signal, controller 62 enables a read/write line(s) to the addressed functional module. More specifically, each functional module coupled to ASIC bus 54 is also coupled to controller 62 via a dedicated read/write line (which may comprise one or more lines). Thus, controller 62 is adapted to impress signal levels on the dedicated read/write line(s) to the specifically addressed functional module, which immediately enables the module to be ready to read or write data. Thus, in a data write action, a write signal applied to a read/write line to a module enables the module to immediately store (write) data that is thereafter impressed on a ASIC bus 54, without requiring a further addressing action to be carried over ASIC bus 54. When a functional module includes plural registers that are externally addressable, the output from controller 62 will also include address values which enable the respective functional module to store the received data within its addressable registers, upon receiving data via ASIC bus 54. A similar action occurs in response to a read signal applied to a modules dedicated read/write line. In such a circumstance, the selected module immediately impresses on ASIC bus 54 the requested data, without requiring a further addressing action.

Figure 3:
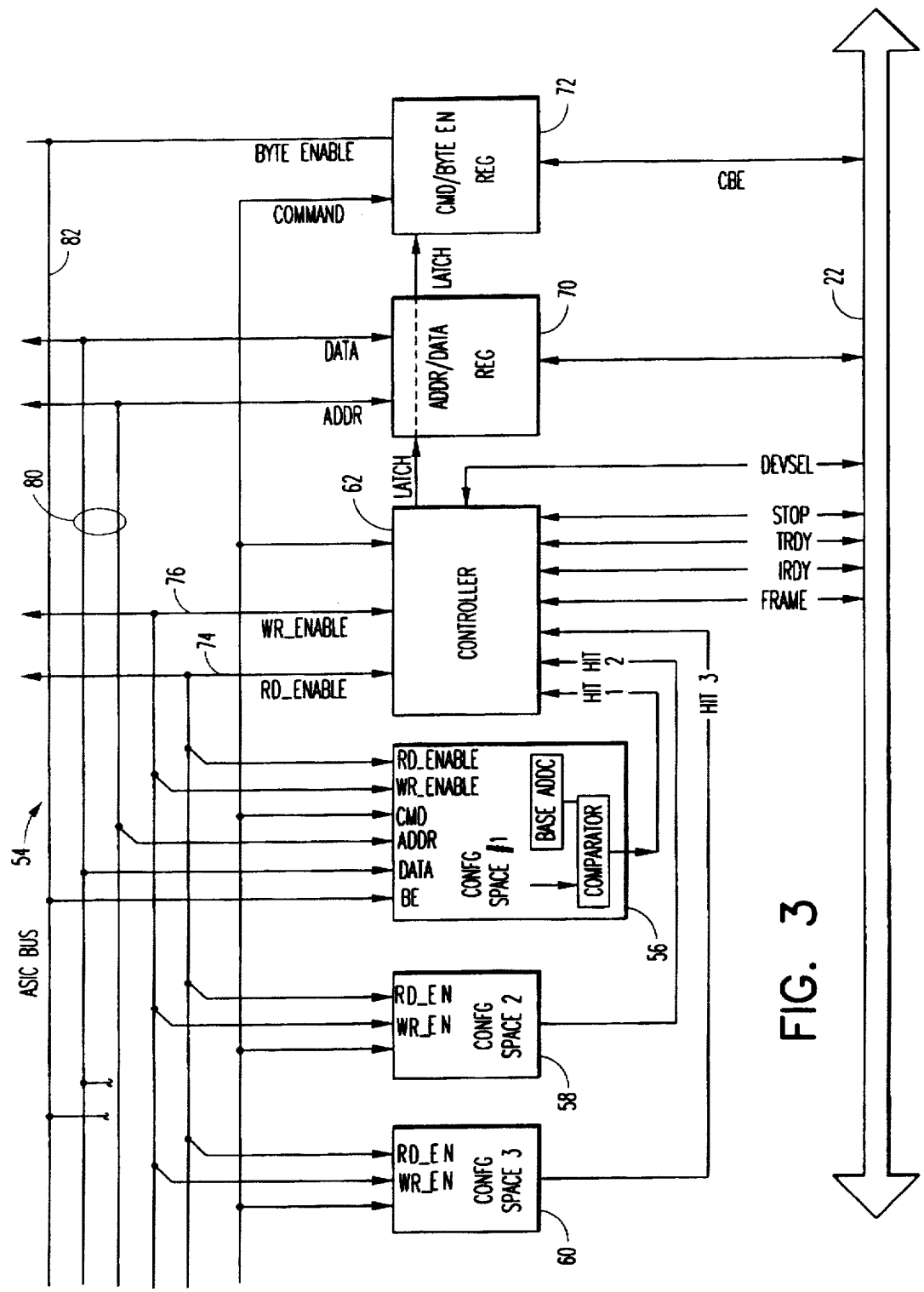
FIG. 3 is a block diagram of further details of portions of the ASIC of FIG. 2 which provide interface functions between a PCI bus and an ASIC bus linking all of the ASIC's functional modules.

FIG. 3 illustrates further details of controller 62 and configuration space modules 56, 58 and 60. An address/data register 70 provides interface buffering for both data and address lines between ASIC bus 54 and PCI bus 22. A command/byte-enable register 72 receives both command and byte-enable data from the respective ASIC bus 54 and PCI bus 22 and acts to buffer that data from one bus to the other.

Prior to describing the detailed operation of the apparatus shown in FIG. 3, each of the interface control signals employed in the operation of the interface system will hereafter be described.

PCI INTERFACE CONTROL SIGNALS

FRAME: This signal is generated by the master and is transmitted to the target. FRAME is driven by the initiator and indicates the start (when first asserted) and duration of a transaction. A transaction may consist of one or more data transfers between an initiator and an addressed target.

TRDY: "Target ready" is driven by a currently addressed target. It is inserted when the target is ready to complete the current data transfer. A data transfer is completed when the target is asserting TRDY and the master is asserting IRDY (initiator ready) at the rising edge of a Clock signal. During a read action, TRDY asserted indicates that the target is driving valid data onto the data bus. During a write, TRDY asserted indicates that the target is ready to accept data from the master.

IRDY: "Initiator Ready" is driven by the current bus master (the initiator of the transaction). During a write, IRDY asserted indicates that the initiator is driving valid data onto the data bus. During a read, IRDY asserted indicates that the initiator is ready to accept data from a currently addressed target.

STOP: A target asserts STOP to indicate that it wishes the initiator to stop the transaction in progress on the current data transfer.

DEVSEL: "Device Select" is asserted by a target when the target has decoded its address. It acts as an input to the current initiator.

ASIC Bus Signals

ADDR(31:2): Address. This signal contains the address of a 32 bit word being transferred. Functional modules receive an address when acting as a slave and source the address when acting as a master. As a slave, address is valid when a functional module's Rd_Enable or Wr_Enable signals are asserted. As a master, address is valid whenever nREQ is asserted.

Data(31:0): Data. Data is driven from the master to the slave for writes and from the slave to the master for reads. As a slave, a functional module will source data when its Rd_Enable signal is asserted and receive data when its Wr_Enable signal is asserted. As a master, the functional module will source data for writes until an assertion of nPCIRdy indicates the data is accepted, and for reads, it will accept the data when nPCIRdy is asserted indicating valid read data has been returned.

nBE(3:0): Byte Enable. The same byte enable used in the PCI bus will be maintained at the interface. Byte enables are driven from the master to the slave.

Rd_Enable: Read Enable. This signal is for reading a register in a functional module when the PCI bus is the master and the ASIC is the slave. When the Rd_Enable signal is asserted, it indicates that the address and byte enables are valid and that the functional module must return the data requested.

Wr_Enable: Write Enable. This signal is for writing registers in a functional module when PCI bus 22 is the master and ASIC bus 54 is the slave. When the Wr_Enable signal is asserted, it indicates the address and byte enables are valid and that the functional module must accept the data being presented.

nPCIRdy: PCI Interface Ready. This signals that the PCI interface is ready to transfer data. When receiving data (e.g. in direct memory access reads), it means that the data is valid. When sourcing data (e.g. a direct memory access write), it means that the interface is ready to receive data.

nRetry: Retry. This signal indicates that the current DMA write burst must be restarted beginning with the last word accepted on the ASIC bus.

nAbort: Abort. This signal is asserted when the ASIC bus master transaction encounters an error condition on the PCI bus. Either the transaction performed on the PCI bus was not answered by a target or the target responded with a target-abort sequence.

nREQ: Request. This signal tells an arbitration functional module that this internal functional module desires use of the bus. Every master has its own nREQ.

nGnt: Grant. This signal tells the functional module that access to the ASIC bus has been granted. Every master has its own nGnt.

Returning to FIG. 3, controller 62 exerts overall control of the interface function between PCI bus 22 and ASIC bus 54. Among other control lines, controller 62 is coupled to the FRAME, IRDY, TRDY, STOP and DEVSEL lines of PCI bus 22. In similar fashion, controller 62 is coupled to each of the functional modules connected to ASIC bus 54 via a Rd_Enable line 74 and a Wr_Enable line 76. Address/Data Register 70 is connected to PCI bus 22 via 31 address lines and command/byte Enable Register 72 is coupled to PCI bus 22 via 3 lines which carry both the command and the byte-enable data. Address/Data Register 70 is also coupled to ASIC bus 54 via plural address and data lines 80 and command/byte enable register 72 connects to ASIC bus 54 via plural lines 82 so as to transfer command and byte enable data to a chosen functional module.

By appropriately conditioning the aforesaid lines, a selected functional module can be rendered responsive to a command and be forced to carry out the action required by the command. Once a Rd_Enable or Wr_Enable line is conditioned, no acknowledgment is required from the connected functional module, it being known that the functional module will respond in the manner required.

Each of configuration space modules 56, 58 and 60 also includes a Wr_Enable and Rd_Enable line connected to controller 62 and is further coupled to ASIC bus 54, as are all remaining functional modules. Thus, each of configuration space modules 56, 58 and 60 is operated in a manner identical to that of all other functional modules. One of the functions of each configuration space module is to examine an address received from Register 70 to determine if the address data matches a base address for the particular configuration space. If yes, the configuration space module issues a hit signal back to controller 62 indicating that a functional module assigned within the configuration space has been addressed. In response, controller 62 examines a small group of bits of the address to determine which functional module has been addressed and, in accordance with the received command, energizes either the Rd_Enable or Wr_Enable lines to that functional module, accordingly.

Hereafter, the function of the interface circuitry of FIG. 3 will be described in conjunction with: (i) a single word write to a functional module; (ii) a single word read from a functional module; (iii) a single word direct memory access write to RAM from a functional module and (iv) a single word direct memory access read from RAM to a functional module.

Figure 4:
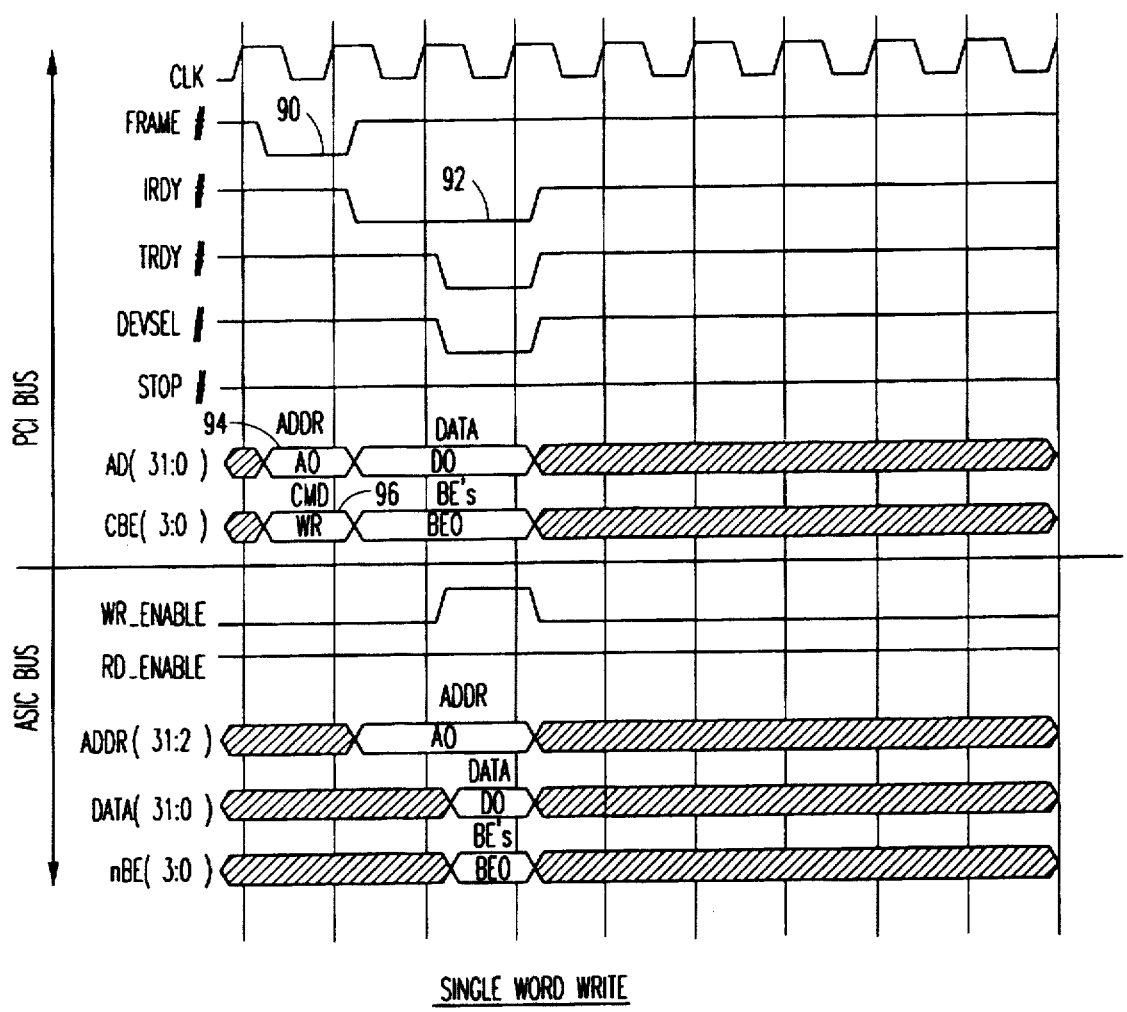
FIG. 4 is a waveform diagram helpful in understanding the operation of the invention during a single word write action.

Turning to the waveform diagram of FIG. 4, a single word write action will be described. Initially, it is assumed that CPU 12 is to write data to a register in one of the functional modules connected to ASIC bus 54. Accordingly (see FIG. 4), CPU 12 issues a Frame pulse 90 followed by an initiator ready (IRDY) signal 92 which indicates that the data is ready to be transferred to a functional module. CPU 12 also drives address data 94 and a write command 96 onto PCI bus 22.

Upon receiving and latching the address and command data in registers 70 and 72, controller 62 issues a target ready (TRDY) and device select (DEVSEL) signals on control lines which form a portion of PCI bus 22. When command/ byte enable register 72 receives a command, upon latching that command, it is also transmitted to controller 62 wherein the command is interpreted and utilized to control the operation of controller 62. Coincidently, controller 62, having been informed by one of configuration space modules 56, 58 or 60 of a "hit" resulting from a comparison of the received address and a stored base address, asserts the write enable line (Wr_Enable) to the selected functional module. Further, it applies the address data, data to be written and byte enable data to ASIC bus 54.

In response to the Wr_Enable signal, the addressed functional module latches the data from ASIC bus 54 and the procedure is at an end. Note that the only decoding of address data required of a functional module is to determine which register, (if there are a plurality thereof) in the functional module is to receive the data to be written. The functional module does not acknowledge the Wr_Enable signal and it is assumed that the write action is successfully completed.

Figure 5:
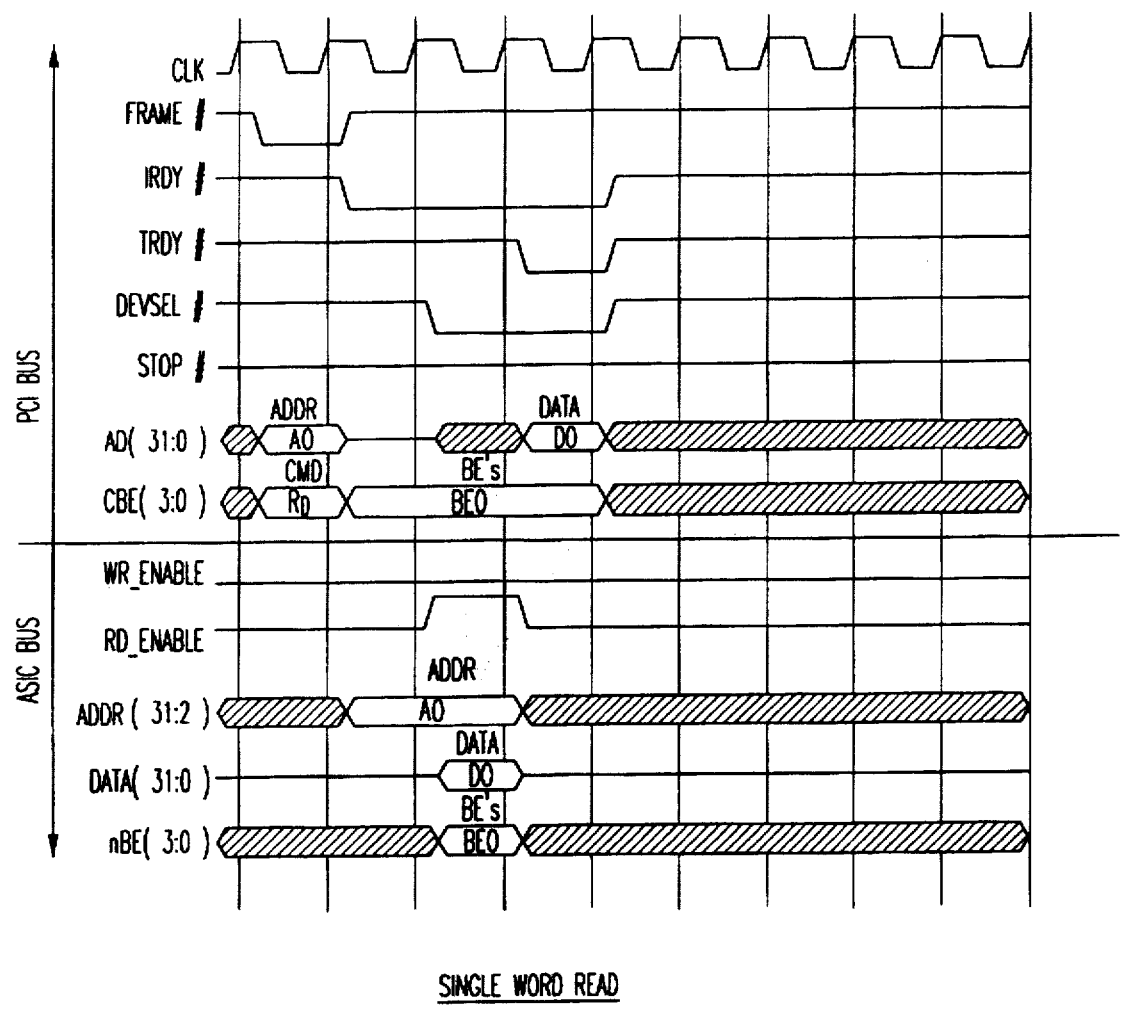
FIG. 5 is a waveform diagram helpful in understanding the operation of the invention during a single word read operation.

Turning to FIG. 5, a single word read action will be described. In this case, data stored in a functional module is fetched and stored in a register in CPU 12, for example. Again, CPU 12 issues the Frame signal and, shortly thereafter, drives the address and command lines of PCI bus 22 with the address of the functional module from which the data is to be read and a Read command. The address and command data is buffered in registers 70 and 72 in ASIC 24. Controller 62, in response to a hit from one of configuration space modules 56, 58, 60, asserts the Rd_Enable line to the addressed functional module which holds the data to be read. Concurrently, the address data is driven onto ASIC bus 54. The addressed functional module responds by driving the requested data onto the data lines of ASIC bus 54. That data is latched in register 70, along with byte enable data in register 72. On a succeeding clock signal, the addressed data is read out of address data register 70 and is impressed on PCI bus 22, from whence it is captured by CPU 12.

Here again, there is no acknowledgement by the addressed functional module of the Rd_Enable signal. Address decoding is performed, in the main, by configuration space modules 56, 58 and 60. Further, note that each of the configuration space modules is connected to ASIC bus 54 in the same manner as are other functional modules. Thus, no special interface functions or control procedures are required between controller 62 and the configuration space modules in order to transfer data to and from the configuration space registers.

Figure 6:
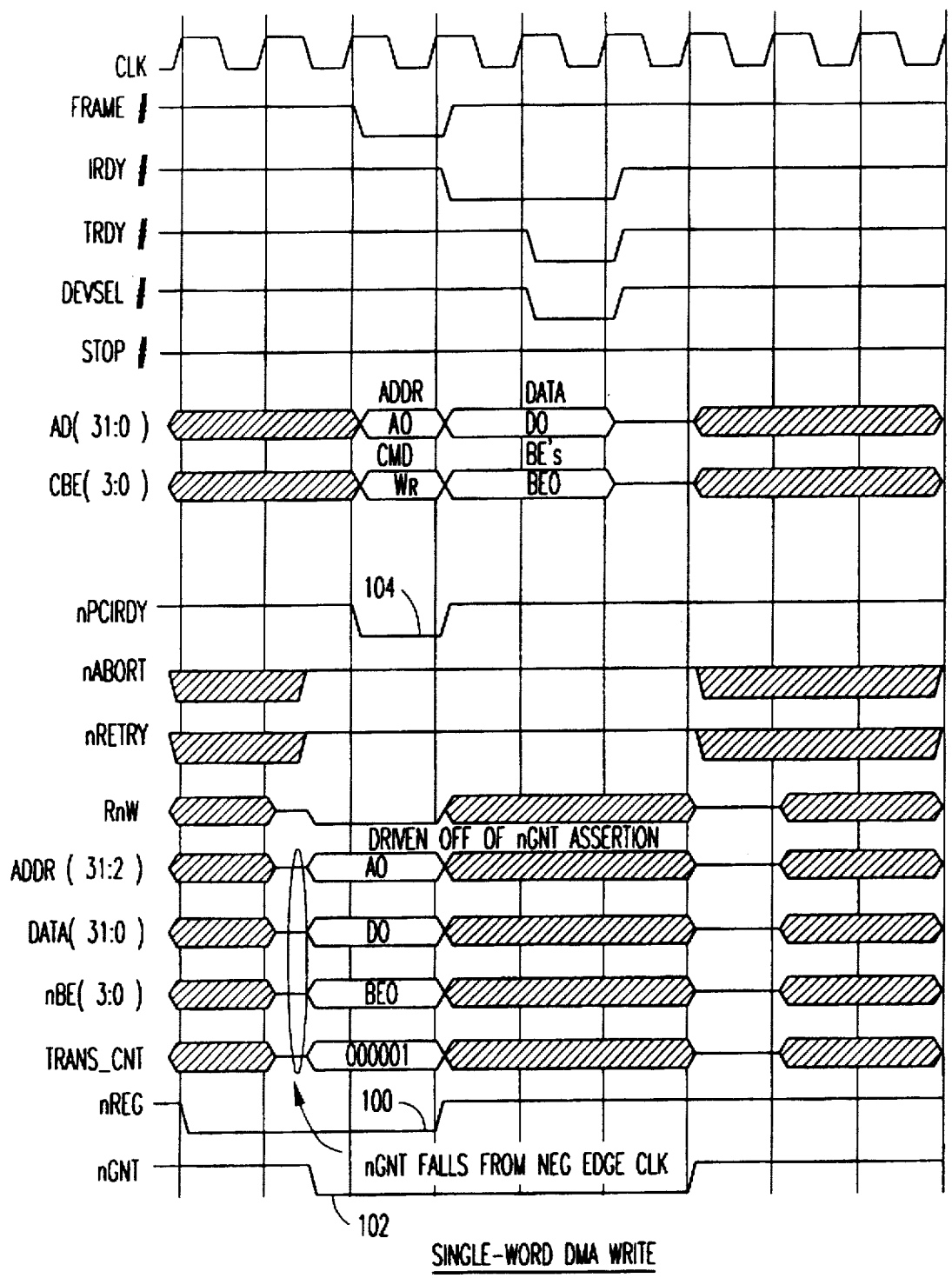
FIG. 6 is a waveform diagram illustrating the operation of the invention during a single word direct memory access write action.

Turning to FIG. 6, a single word DMA write will be described. In this instance, the read/write enable lines are not employed, as a functional module acts as a master and causes data stored therein to be directly written to RAM 14, without intermediate storage in CPU 12. To commence a DMA write, the functional module issues an nREQ signal 100 which requests access to PCI bus 22. A PCI bus arbiter (not shown) examines the state of PCI bus 22 and if it is available, issues an nGnt signal 102 back to the requesting functional module which grants access to PCI bus 22. Thereafter, the functional module which has been granted PCI bus 22, drives address and data signals onto ASIC bus 54 along with byte enable data and a transfer count. In response, Controller 62 drives a Frame signal onto PCI bus 22 which causes the address and command data to be read out from registers 70 and 72 and driven onto PCI bus 22, thereby enabling set up of the necessary gates associated with RAM 14. Previously, the functional module seeking to perform a single DMA write has also issued a read/write (RnW) signal onto the ASIC bus 54 indicating a data write action. Thereafter, when all of the necessary data has been latched into registers 70 and 72, controller 62 issues a nPCIRdy signal 104 which enables transfer of the data and byte enable control signals to RAM 14.

Figure 7:
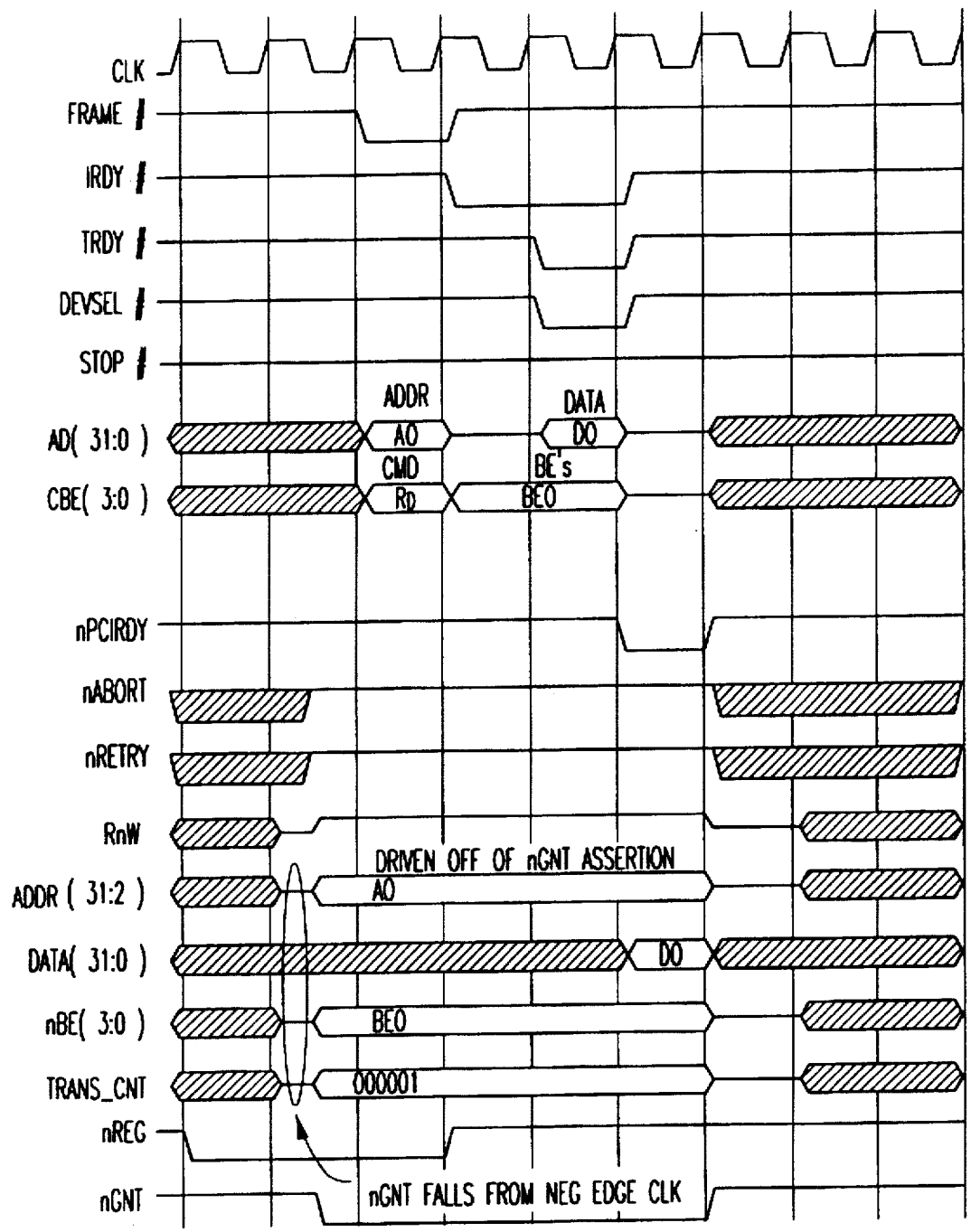
FIG. 7 is a waveform diagram illustrating the operation of the invention during a single word direct memory access read action.

In FIG. 7, the waveforms required to perform a single word DMA read from RAM 14 are shown. Note that again, the functional module impresses a bus request (nReq) level onto ASIC bus 54. Upon the arbiter granting the requesting functional module access to the bus, both the address and byte enable data indicating the area within RAM 14 to be read are driven onto ASIC bus 54 and into registers 70 and 72, respectively. Thereafter, through appropriate control signals, CPU 14 causes a read out of the requested data from RAM 14 and impresses that data on PCI bus 22 where it is captured by register 70. After that action is complete, controller 62 asserts the nPCIRdy level, causing the latched data in register 70, 72 to be driven onto ASIC bus 54 and into the requesting functional module.

As can be seen from the above, the described interface functionality provides a simple interface which enables attached functional modules to access the PCI bus. It also provides a multi-function interface, which allows multiple function configuration spaces within the same ASIC without requiring duplication of the entire PCI interface for each functional module. The interface enables ready expansion to accommodate additional functional modules as well as additional configuration spaces and may be customized to the needs of each attached module, e.g., the number of DMA channels, number of interrupts, priorities of DMA channels, pulse width of enable signals, etc.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A data processing system including a processor and random access memory (RAM), said data processing system further comprising:

first bus means configured to operate in accord with a standard protocol, coupled to said processor;

plural functional modules, each for performing a function required by said data processing system;

second bus means coupled to each of said plural functional modules and including a dedicated read/write control circuit connected to each of said functional modules and plural data lines coupled in common to all said functional modules; and bridge module means coupled between said first bus means and second bus means and including control means responsive to a command from said first bus means to write data to a designated functional module, to apply a write control signal to the dedicated read/ write circuit connected to said designated functional module and to further apply data to be written to said plural data lines, said designated functional module responding to said write control signal by writing said data into a register resident in said designated functional module.

2. The data processing system as recited in claim 1, wherein said control means is responsive to a command received over said first bus means to read to a given address, stored data from a designated functional module, to apply a read control signal to the dedicated read/write circuit connected to said designated functional module, said designated functional module responding to said read control signal by applying said stored data to said plural data lines, said control means causing said stored data to be transferred from said plural data lines to said first bus means for transmission to said given address.

3. The data processing system as recited in claim 2, wherein said bridge module further comprises:

configuration module means for identifying at least a subset of functional modules coupled to said second bus means, said configuration module means coupled to said second bus means and connected by a dedicated read/write circuit to said control means, said configuration module means responsive to a control signal applied to said dedicated read/write circuit and an address applied to said second bus means by said control means which identifies at least one of said subset of functional modules, to indicate to said control means an identity of the functional module which is addressed.

4. The data processing system as recited in claim 3, wherein said standard protocol is Peripheral Component Interconnect (PCI), which is implemented under control of said processor.

5. The data processing system as recited in claim 4, wherein said plural functional modules, said second bus means, said control means and said configuration module means are all configured on an Application Specific Integrated Circuit (ASIC).

* * * * *